United States Patent [19]
Roundhill et al.

[11] Patent Number: 5,617,863
[45] Date of Patent: *Apr. 8, 1997

[54] ULTRASONIC DIAGNOSTIC IMAGE SCANNING TECHNIQUES

[75] Inventors: David N. Roundhill, Bothell; Mikhail Starosta, Snohomish; David Rust; Clifford R. Cooley, both of Seattle, all of Wash.

[73] Assignee: Advanced Technology Laboratories, Inc., Bothell, Wash.

[*] Notice: The portion of the term of this patent subsequent to Oct. 7, 2014, has been disclaimed.

[21] Appl. No.: 489,668

[22] Filed: Jun. 12, 1995

Related U.S. Application Data

[63] Continuation-in-part of Ser. No. 319,757, Oct. 7, 1994, Pat. No. 5,438,994.

[51] Int. Cl.⁶ .................................................. A61B 8/00
[52] U.S. Cl. ............................................... 128/661.01
[58] Field of Search .................... 128/660.07, 660.08, 128/661.01; 73/619, 621, 625, 626, 633, 641; 367/7

[56] References Cited

U.S. PATENT DOCUMENTS

| | | | |
|---|---|---|---|
| 4,159,462 | 6/1979 | Rocha et al. | 340/1 R |
| 4,561,308 | 12/1985 | Bele et al. | 73/626 |
| 4,888,694 | 12/1989 | Chesarek | 364/413.24 |
| 4,993,417 | 2/1991 | Seo | 128/661.09 |
| 5,105,813 | 4/1992 | Shikata | 128/660.07 |
| 5,123,415 | 6/1992 | Daigle | 128/661.01 |
| 5,142,649 | 8/1992 | O'Donnell | 367/7 |
| 5,144,954 | 9/1992 | Satake | 128/661.09 |

*Primary Examiner*—George Manuel
*Attorney, Agent, or Firm*—W. Brinton Yorks, Jr.

[57] ABSTRACT

A technique for scanning an image field with adjacent beams of ultrasonic energy is provided in which initially transmitted beams are transmitted along beam directions at the lateral sides of the image field. Subsequent beams are alternately transmitted on either side of the initially transmitted beams and at lateral locations which converge toward the center of the image field until the full image field has been scanned. In an alternate embodiment initially transmitted beams are transmitted on one side of the center of the image field, subsequent beams diverge from the locations of the initially transmitted beams, and concluding beams laterally converge at a location on the other side of the center of the image field.

18 Claims, 5 Drawing Sheets

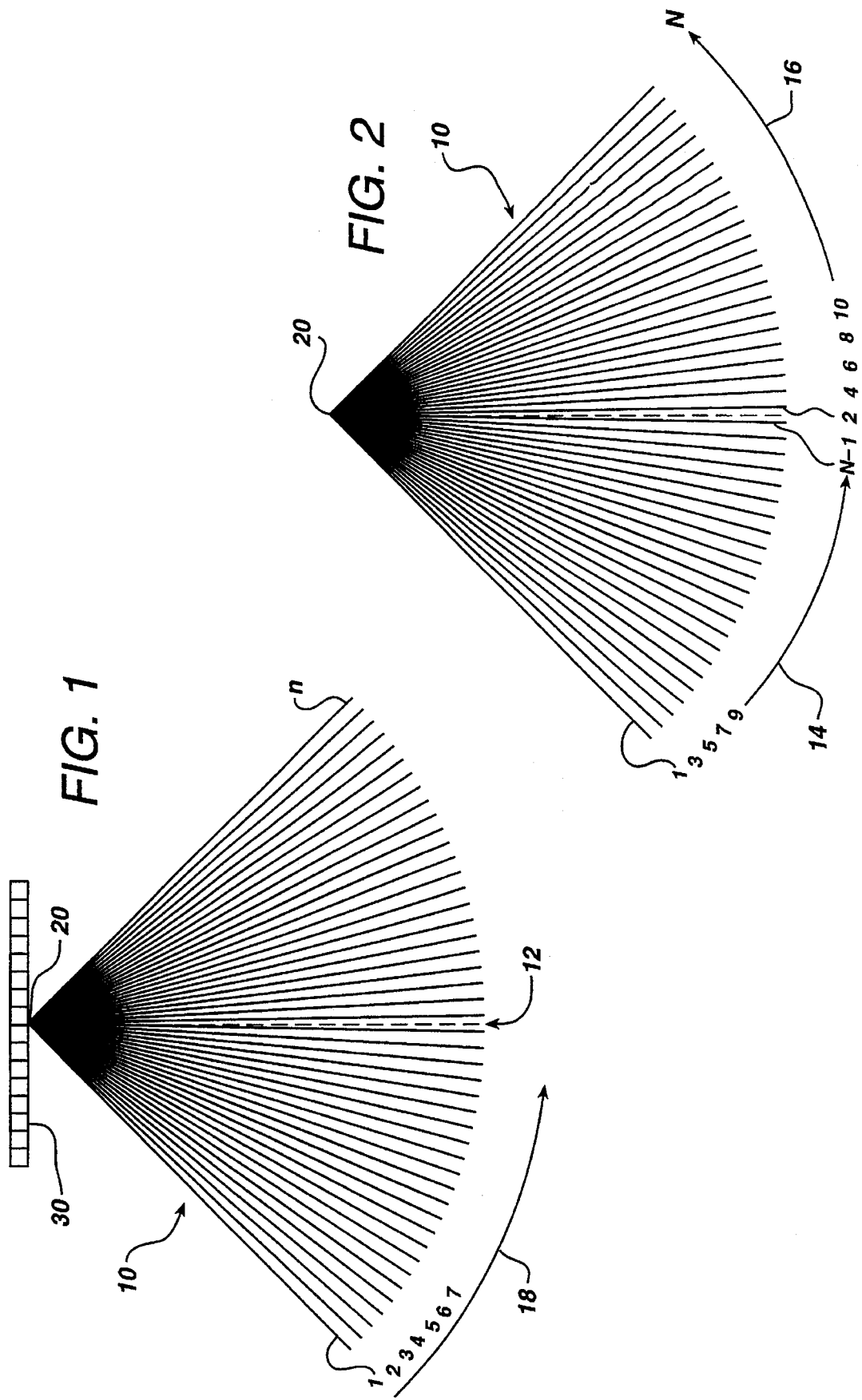

ULTRASONIC DIAGNOSTIC IMAGE SCANNING TECHNIQUES

This is a continuation in part of U.S. patent application Ser. No. 08/319,757, filed Oct. 7, 1994 and entitled "ULTRASONIC DIAGNOSTIC IMAGE SCANNING," now U.S. Pat. No. 5,438,994.

This invention relates to improvements in ultrasonic diagnostic imaging techniques, and in particular to ultrasonic image scanning techniques which reduce the effects of temporal scanning artifacts in an ultrasonic image.

Ultrasonic images can suffer from a number of image artifact problems, one of which is due to range ambiguities induced by multipath reflections. Ultrasonic images are developed by transmitting ultrasonic pulses over a range of directions called beam directions which cover an image field of a subject being imaged, such as the interior of the human body. After each ultrasonic beam is transmitted echoes are received from along the beam direction over a predetermined depth of field. These transmission and reception sequences are repeated until beams have been scanned over and echoes gathered from along beam directions which cover the desired image field. By computing the time of flight of ultrasonic pulses and echoes together with the beam directions, the locations of specific echoes received from the image field are determined. After all of the echoes from the beams of the image field have been received and so arranged in an image format, the resultant ultrasonic image is displayed on a monitor.

It may be seen that the time required to produce an ultrasonic image is determined by the number of beams comprising the image and the sum of the times required to transmit each beam and receive the resulting echoes. Each transmit-receive sequence is followed by another in a different beam direction until the entire image field has been scanned and echoes recorded. The time required to assemble the echo information needed to display a full image establishes the rate at which consecutive images can be displayed, the frame rate. High frame rates are desirable to eliminate any disturbing flicker or hesitation in the real time display of images. Moreover, it is often desirable to increase the number of scan lines in the image to improve image quality, which reduces the frame rate. Furthermore, the transmitted image beams are often interlineated in time with narrow band Doppler pulse transmission and reception sequences for the simultaneous display of a structural image with flow information. The complete set of image and Doppler sequences can cause the time to assemble one display frame to increase substantially, and a commensurate significant decline in the frame rate of display.

These considerations have led to efforts to reduce the time of the transmit-receive imaging sequences in various ways. Attempts to reduce the scanning time have often focused on overlapping two transmit-receive sequences in time, generally by transmitting a pulse in first and second beam directions, receiving echoes from the first beam direction and then the second. This generally requires the use of separate subgroups or subapertures of a transducer array, such as the linear array subaperture sequencing shown in U.S. Pat. No. 4,561,308 (Bele et al.)

The problem encountered by these approaches is that the transducers receiving echoes from one beam direction can also be receiving echoes resulting from the pulse transmission in another beam direction. The possibility of such cross contamination of the received signals is heightened whenever the pulse sequencing falls below the full round trip time of a pulse and its echoes. Moreover, the inadvertent reception of echoes caused by other than the intended transmitted pulse is possible even when the full round trip time is observed. This is due to what is referred to as multipath reception. Multipath reception arises when a first pulse is reflected by structure so as to continue to travel through the image field, generating echoes and itself even returning to the transducer, during the reception period of a subsequent transmit-receive sequence. It is sometimes necessary to reduce these artifacts by allowing time between sequences during which the multipath reflections become attenuated and dissipate. This is done by allowing a user to insert a waiting period of a selected length after reception of echoes and prior to the next pulse transmission. During the waiting period the repeated reflections will become attenuated by their passage through the subject being imaged. It may be appreciated that adding a waiting period to diminish these artifacts will cause an increase in the time required to assemble an image frame, and a consequent further reduction in the image frame rate.

A solution to this problem of multipath echo reception is found in U.S. Pat. No. 5,438,994 which is assigned to the same assignee as the present invention and is incorporated herein by reference. In the technique of this patent, a divergent scanning technique is provided which reduces multipath artifacts in the received echo signals. The scanning sequence is performed by symmetrically scanning beam directions alternately on respective sides of the image. The sequence begins by scanning the two central beam directions of the image and then continues by scanning outwardly from the two central beams in divergent directions, alternating from one side of the image to the other. To reduce multipath reception artifacts in the center of the image a relatively long pulse repetition interval may be inserted between the transmit-receive sequences of the central beam directions, where consecutive beam scans are most closely adjacent. As the scanning sequence diverges from the center of the image and consecutively transmitted beams become more widely separated in space, the waiting period is reduced and then eliminated to increase the frame rate.

It has been found that an artifact can develop down the center of the divergently scanned image. The center line of the image is scanned as the first line scanned of each new image frame. This causes the center line to be significantly noise-free as compared to other divergently scanned lines, since an adjacent line has generally been scanned within two transmission-reception time periods. This unique characteristic of the center line can cause an artifact to appear down the center of the image in the form of a faint or dim central line.

In accordance with the principles of the present invention the central artifact caused by divergent scanning is overcome by scanning the image in a convergent scan pattern. In a basic embodiment convergent scanning begins on one lateral extreme of the image, then scans the line on the other lateral extreme, and continues scanning alternately inward from these two lateral extremes. This effectively relocates the central artifact of the divergently scanned image to the most lateral extreme of the image where it is not noticeable.

A further embellishment of this technique is to divergently scan the image beginning with a different starting point in each successive image frame. The starting point in each successive frame can rotate from one line to the next, or can be randomly chosen. This variation in the starting point will dissipate the effect of the artifact by continually relocating it to a different position each frame and allowing it to be reproduced in the same place no more than once in succession.

IN THE DRAWINGS

FIG. 1 illustrates a conventional sequential sector scanning sequence;

FIG. 2 illustrates a sequence of alternately transmitting beams over the two halves of a sector to achieve uniform temporal beam separation on each side of the sector;

Figure 3:
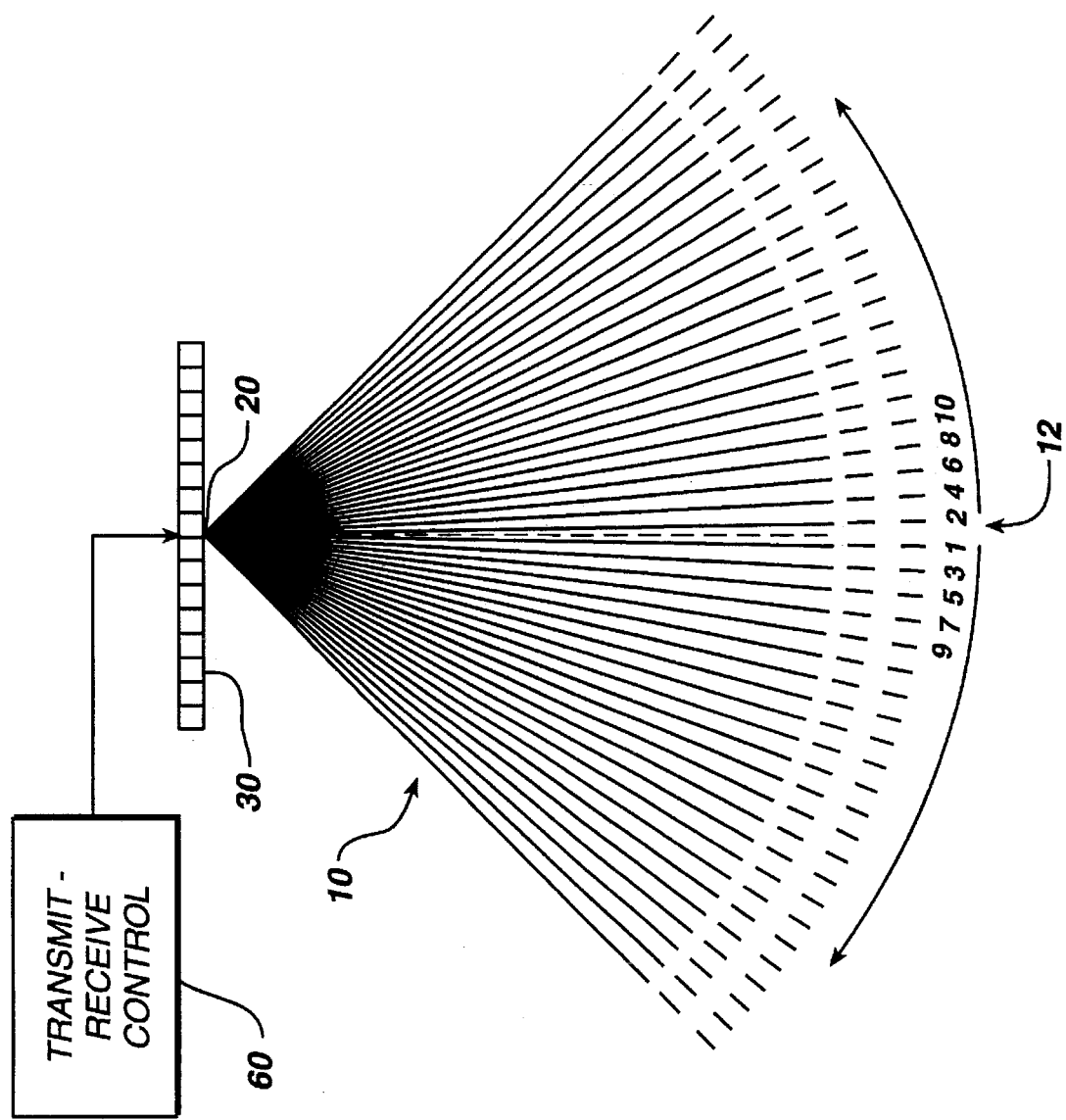
FIG. 3 illustrates the divergent beam scanning sequence of in U.S. patent [application Ser. No. 08/319,757]

Referring first to FIG. 1, a conventional sector scanning sequence is illustrated. The image sector 10 comprises n scan lines along which focused ultrasound pulses are transmitted and from which echoes are received by an ultrasonic transducer 30 located at or in the vicinity of the apex 20 of the sector. The transducer 30 in this example is a multielement transducer by which an ultrasound beam can be electronically focused and steered as is known in the art on both transmit and receive. The sector area 10 which is covered by the successively transmitted beams is seen to be in the shape of a section of a circle and is drawn with a center line 12. The n transmitted beams are distributed on either side laterally of the illustrated center line 12.

Successive beams are transmitted as shown by beams numbered 1, 2, 3, and so forth beginning at the left lateral side of the sector. After a pulse is transmitted in each beam direction there is a reception period during which echoes are received by the transducer from along the beam direction. After echoes have been received from the greatest distance from the transducer in a given beam direction the receiver is turned off and the transducer's control system is readied for transmission in the next beam direction. Transmission and reception continues in this sequence and ends with the beam identified as n at the right lateral side of the sector.

It is seen in FIG. 1 that each successive beam direction is immediately adjacent to the previous beam direction. Thus, if multipath reflections are passing back and forth along a given beam direction they will most likely be overlapping the adjacent beam direction along which echoes are next to be received. There is a likelihood that multipath reflections from the previous beam transmission will be received and artifacts created when the transducer is activated to begin receiving from along the adjacent beam direction.

To overcome such multipath reception with this scanning sequence, a waiting period is inserted following each transmit-receive sequence. After echoes have been received from the maximum desired depth along one beam direction, the transmitter is inhibited for a waiting period which, together with the transmission and reception time, are referred to as the pulse repetition interval, or PRI. During the waiting period of the PRI the multipath reflections will become attenuated by passage through the subject. After waiting for a time during which the intensity of these reflections is expected to diminish to a desired low level, the next transmitreceive sequence begins in the next beam direction. By waiting for an appreciable waiting period, such multipath artifacts can be significantly reduced, but at the expense of a corresponding significant increase in the time needed to scan all beam directions and a consequent reduction of the image frame rate, the rate determined by the time required for all n lines to be scanned and the sector image assembled and displayed.

FIG. 2 illustrates one known approach to reducing the problem of multipath reflection artifacts In FIG. 2, N beam directions are scanned in the sequence of the illustrated beam numbering. The lateral beam direction 1 is scanned first. The second beam direction to be scanned is the beam direction 2 which is to the right of the center line of the sector 10. The third beam direction to be scanned is numbered 3, spatially adjacent to beam 1. The fourth beam direction scanned is labeled 4, spatially adjacent to beam 2. The sequence continues in this manner, alternating between the previously scanned beam directions of each half of the sector, and ending with the scanning of beam directions N–1 and N.

This approach reduces multipath reflection artifacts by causing consecutively scanned beam directions to be spatially half a sector apart. Multipath reflections along beam direction 1, for example, should have little effect on echoes received immediately thereafter from along beam direction 2. The temporal disparity between the scanning of adjacent lines is uniformly established at two PRI's. Beam direction 3 is scanned two PRI's after beam direction 1, beam direction 5 is scanned two PRI's after beam direction 3, and so forth.

This technique creates a significant temporal disparity at the center of the sector, however. There it is seen that beam direction 2, which is the second beam direction scanned, is scanned almost a full frame interval prior to adjacent beam direction N–1, which is the second-last beam direction scanned. While each half of the sector will have a pleasing appearance, there will be a distinct vertical banding down the center of the sector by reason of the sharp temporal disparity in the scanning of the adjacent central beam directions. Images scanned by this technique are often referred to as "dual wiper" images, as the vertical banding down the center will give the appearance of an automobile windshield which has been swept by two windshield wipers.

These deficiencies of the prior art are addressed by the scanning technique of U.S. Pat. No. 5,438,994 which is shown in FIG. 3. In FIG. 3 the timing of a transducer array 30 is controlled by a transmit-receive controller 60. The scanning sequence begins by sequentially scanning the two beam directions 1 and 2 on either side of the center line 12 of the sector 10. After beam direction 2 on the right side of the sector has been scanned, the beam direction 3 to the left of beam direction 1 is scanned. This is followed by the scanning of beam direction 4 to the right of beam direction 2. It is seen that the scanning sequence proceeds laterally outward from the center of the sector and alternates back and forth from one side of the sector to the other.

It is seen that this inventive scanning technique preserves a temporal uniformity in the scanning of spatially adjacent beam directions. Each beam direction is scanned two PRI intervals apart from its spatial neighbors uniformly across the entire image. The problem of multipath reflection artifacts is markedly reduced by the two PRI intervals between spatially adjacent beam directions. Multipath reflections have a two PRI period of time to dissipate before a spatially adjacent beam direction is scanned.

The deficiencies of the prior art techniques are seen to be overcome everywhere except at the center of the sector, for there it is seen that spatially adjacent beam directions 1 and 2 are scanned in succession. Furthermore, there is not a significant spatial separation between the nearest lateral beam directions, such as beam directions 3 and 4.

Figure 4:
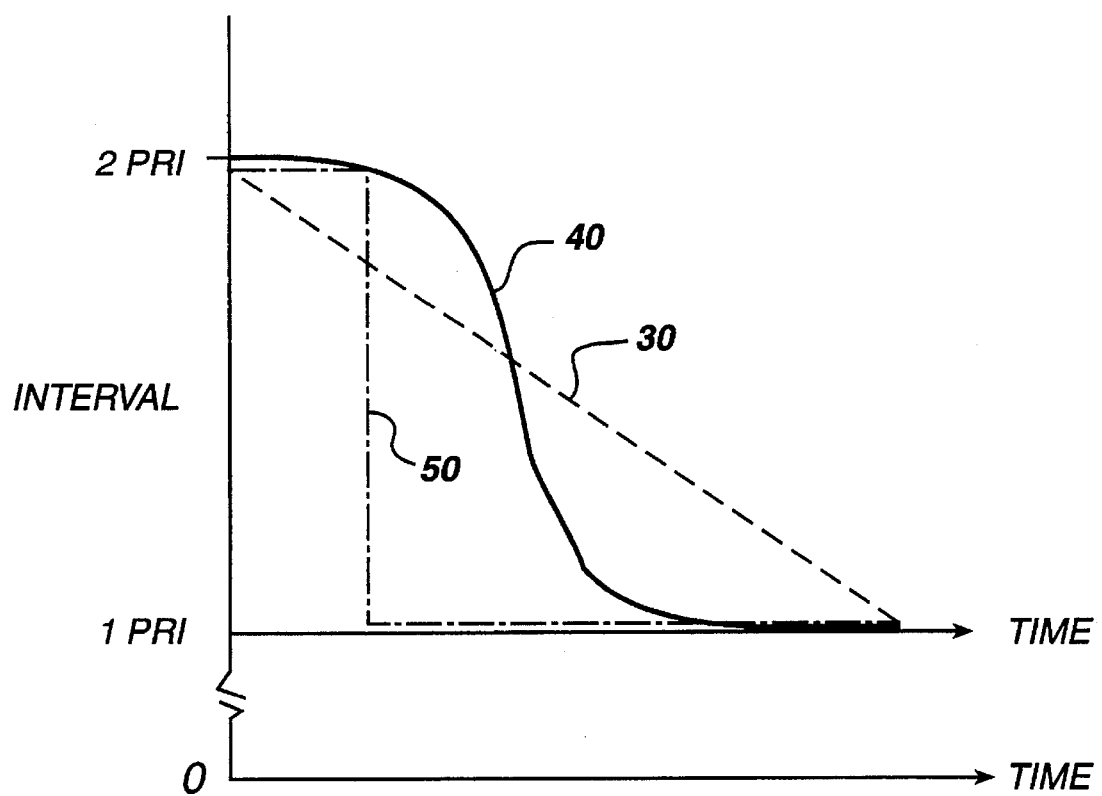
FIG. 4 illustrates a PRI versus time plot for controlling the PRI during times of adjacent and near adjacent beam scanning.

These apparent drawbacks may be addressed by using a greater PRI at the center of the sector than at lateral areas of the sector as illustrated by the graph of FIG. 4. This graph shows techniques for varying the PRI over the time interval that the full sector is scanned. Since beam directions 1 and 2 are spatially adjacent to each other, the dashed line 30 shows that a full waiting period of one PRI is inserted between the transmit-receive sequences of these two lines. During this one PRI waiting period multipath reflections in the vicinity of beam direction 1 are given a full PRI interval to dissipate before adjacent beam direction 2 is scanned. As the consecutively scanned beams move further and further apart spatially, this waiting period is reduced toward zero at a time when it is no longer needed. Dashed line 30 shows a smooth linear reduction in this PRI interval over time from one sequence to the next.

Alternately, as broken line 50 in FIG. 4 shows, calculations and experience may show that the waiting periods are not needed after a relatively short period of time. This broken line shows the maintenance of a full PRI interval waiting period between the initial time consecutive sequences, and a sudden change to no additional waiting time when consecutively scanned beams exhibit sufficient spatial separation and no longer benefit from the additional PRI interval. It has been found, however, that a vertical band may appear in each half of the sector between those beam directions where the shift in PRI occurred.

Another alternative waiting period variation is shown by the curve 40 in FIG. 4. This curve shows the maintenance of a waiting period of about a full PRI interval between beam scanning sequences in the vicinity of the center of the sector. Shortly thereafter, however, there is a smooth but rapid decline in the waiting period between consecutively scanned beam directions. The waiting period decline quickly reaches zero, after which there is no waiting period between consecutively scanned beams and a uniform one PRI interval is established between the scanning times of time consecutive beams, resulting in two PRI intervals between the scanning times of the remaining adjacent beams. This PRI variation technique will yield a beneficial balance between multipath artifact reduction and maintenance of a relatively high frame rate.

A variation of the inventive scanning sequence is to scan outwardly from the center of the sector during one image frame, then inwardly from the lateral edges of the sector during the next successive frame. The sequence alternates back and forth between inward and outward scanning during successive image frames. While providing the benefits enumerated above for the preferred embodiment, this variation has the characteristic of a frame to frame variation in the temporal scanning of each beam direction. After the central beam directions 1 and 2 have been scanned at the beginning of the scanning period for the first frame, almost two frame intervals pass before they are scanned at the end of the second frame scanning period. These beam directions are then scanned immediately thereafter at the beginning of the third frame scanning period. Consequently, this varying sequence may not be as completely free of the effects of temporal scanning nonuniformity as the preferred embodiment.

It has been found that the divergent scanning sequence of FIG. 3 can result in a slight vertical artifact at the center of the sector due to the start of the sequence at the center of the sector. The last beam direction scanned for a given image is one of the most lateral beam directions. The first beam direction scanned at the start of a new image is beam direction 1 at the center of the sector. Beam direction 1 is transmitted at a time when the preceding transmissions have been at the most lateral extremities of the previous image. Hence, a considerable amount of time has passed since any transmission occurred at the sector center, leaving the center significantly free of echo artifacts from previous transmissions. The echoes received from along beam direction 1 will thus be significantly free of artifacts and noise.

This is not the case of beam directions 2, 3, and so on, even with two PRI intervals between transmissions. Some faint reflections or reverberations may still remain in the vicinity of these beam directions. Beam direction 1 was scanned at a time when almost a full image period has passed since a nearby disturbance occurred and will be significantly free of artifacts. Consequently the echoes from beam direction 1 can appear fainter than those of the surrounding beams, simply due to the exceedingly noise free environment from which they were received. The central line of the sector can therefore appear different from its neighbors, an "artifact" in the image.

Figure 5:
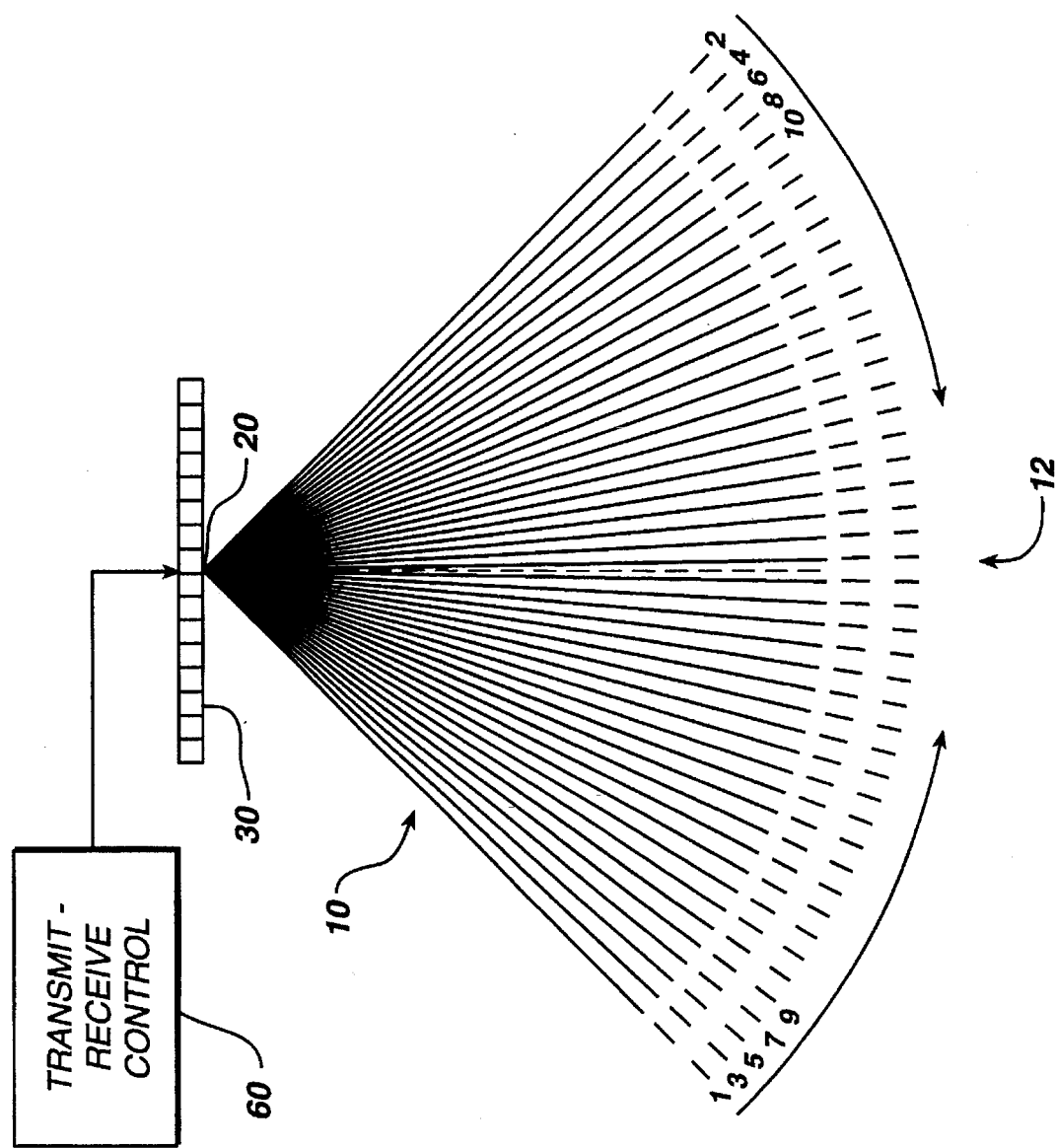
FIG. 5 illustrates a convergent scanning technique in accordance with the principles of the present invention.

In accordance with the principles of the present invention, this temporal artifact at the image center can be eliminated by convergent scanning of the sector as illustrated in FIG. 5. As shown in this drawing, the scanning of the sector begins with beam direction 1 at one lateral extreme of the image. The second beam direction 2 scanned is at the other lateral extreme of the image. Alternate scanning continues from side to side as shown by the numbered beam directions, ending at the center of the image. This causes the center beams to be temporally related and substantially equally affected by surrounding remnant reverberations from previous transmissions, eliminating the faint appearance down the center of the image.

As the scanning sequence approaches the center of the image time sequential beams approach each other spatially, increasing the possibility of multipath reception. This condition can be addressed by increasing the PRI spacing of the transmitted beams, the concept represented by the curves of FIG. 4. But in the case of convergent scanning the curves of the graph are reversed. Instead of beginning with a long PRI interval at the center then shortening the PRI interval as the beams diverge, the sequence of FIG. 5 begins with short PRI intervals and ends with longer PRI intervals as the scanning beams converge at the center; essentially, the curves are reversed in time.

It may be appreciated that the effective result of convergent scanning as compared with divergent scanning is to relocate the first beam scanned in a given frame, and hence the artifact, to the most lateral extremes of the image, where it is unnoticeable. To fully eliminate this temporal artifact, transmissions without echo reception could be employed at either lateral side of the sector prior to the commencement of the beam transmissions from which echoes are to be received.

Figure 6:
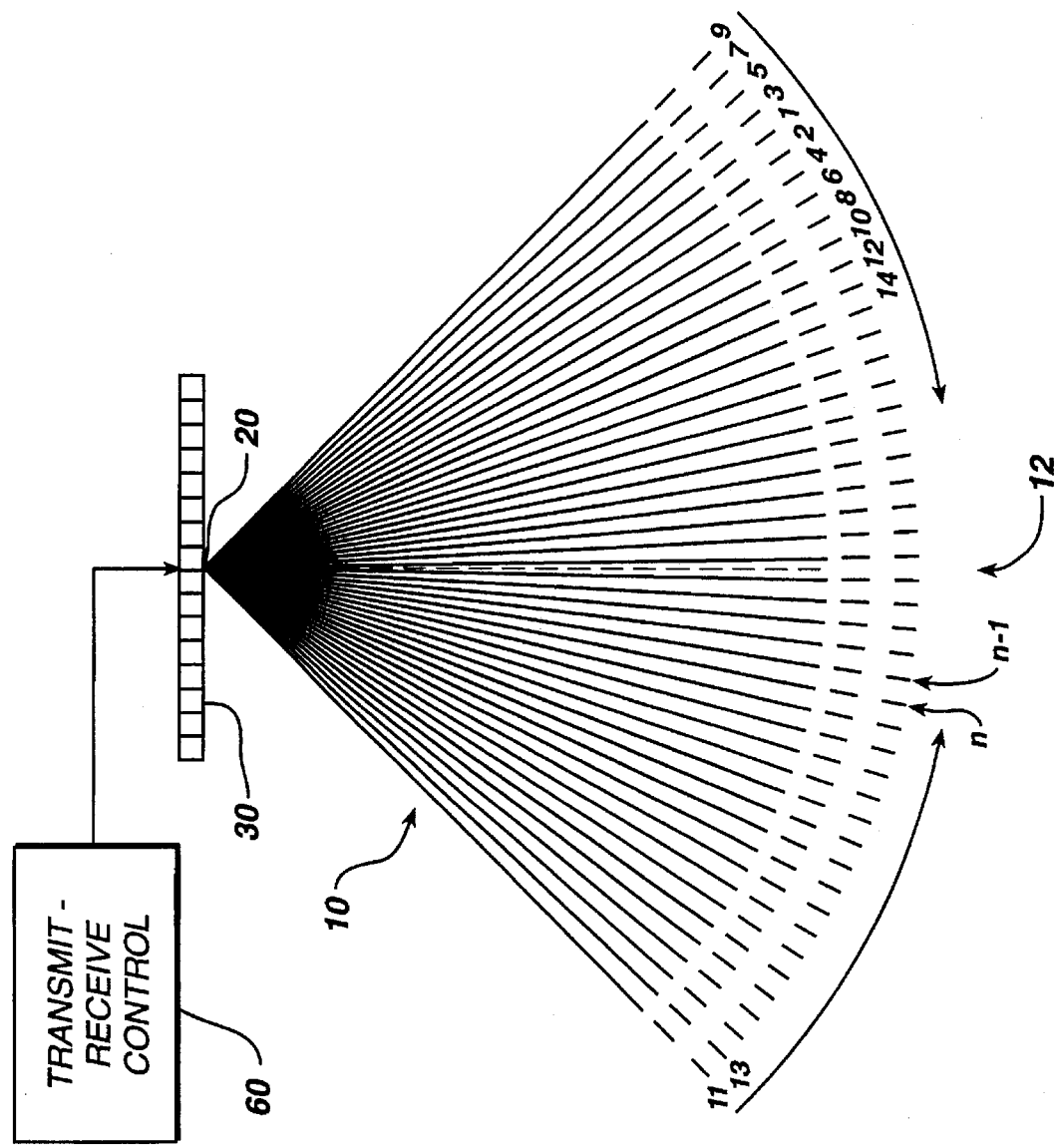
FIG. 6 illustrates another convergent scanning technique in which the position of the first line changes from frame to frame.

This recognition of the effective result of convergent scanning leads to a further refinement, which is to change the location of beam direction 1, the first beam scanned, from one frame to the next. FIG. 6 illustrates the scanning sequence beginning five lines in from the right lateral side of the sector. From the perspective of this point of the sector, the scanning sequence is diverging, as lines 1, 2, 3, 4, 5, etc. sequentially diverge from beam directions 1 and 2. After beam 9 has scanned the right lateral side of the sector, beam 11 scans the left lateral side and subsequent odd. numbered beams scan inward from the left side of the sector. From the perspective of the left side of the sector the scanning sequence is converging, and will end five lines to the left of the center line 12.

When the next frame is scanned, the first beam direction is located in a different beam direction. The first beam direction could be rotationally changed, proceeding to the sixth or fourth line in from the right lateral side of the sector, it could be randomly chosen, or it can vary in some other manner from frame to frame. This first beam alteration technique has the effect of eliminating the faint first line artifact by continually relocating it and thereby uniformly blending it into the real time image sequence. The blending may be effected by the frame rate of the real time display, or successive frames can be averaged to eliminate the artifact.

While the present invention has been described in terms of a sector comprising a radial array of beam directions, it will be appreciated that the inventive scanning sequence is also applicable to other scanning formats such as the rectangular format of a linear scan. In the linear format, the ultrasonic beams are transmitted in parallel directions from groups of transducer elements of a linear transducer array. The linear scan will proceed in the same manner as the sector scan, beginning with the two most lateral beams and proceeding alternately to scan beam directions on the inward side of the two initial beam directions and proceeding toward the center. Trapezoidal and other beam patterns are also possible.

What is claimed is:

1. A method for scanning an image field with pulses of ultrasonic energy which are transmitted in a plurality of beam directions extending spatially adjacent to each other over said image field from one lateral extreme of said image field and through the center of said image field to an opposite lateral extreme, comprising:

transmitting in a first beam direction and then in a second beam direction which directions are substantially respectively located at said lateral extremes of said image field; and thereafter transmitting in a third beam direction which is adjacent and laterally interior to said first beam direction and then in a fourth beam direction which is adjacent and laterally interior to said second beam direction; and then continuing to scan said image field by transmitting in beam directions which are alternately on opposite lateral interior sides of previously transmitted beam directions.

2. The method of claim 1, wherein said beam directions spatially radiate from a common point in a sector format.

3. The method of claim 1, wherein said beam directions spatially extend in parallel to each other.

4. The method of claim 1, wherein said first and third beam directions are on one side of the center of said image field, and said second and forth beam directions are on the other side of said center of said image field.

5. The method of claim 4, further comprising the step of controlling the times of transmission of said ultrasonic pulses wherein the time intervals between transmission in said first and second beam directions are less than the time intervals between transmission of consecutive pulses at the center of said image field.

6. The method of claim 5, further comprising the step of receiving ultrasonic echoes from said respective beam directions for a predetermined period of time following said respective pulse transmissions.

7. The method of claim 6, further comprising the step of controlling the times of transmission of said ultrasonic pulses includes inserting relatively longer waiting periods of time following reception of ultrasonic echoes after transmission in the vicinity of the center of said image field and inserting relatively shorter waiting periods of time following reception of ultrasonic echoes in the vicinity of the lateral extremes of said image field.

8. The method of claim 7, wherein said waiting period of time following reception of ultrasonic echoes at the lateral extremes of said image field are substantially zero periods of time.

9. Ultrasonic apparatus for scanning an image field of a subject extending in substantially opposite directions from the middle of said field to lateral extremes of said field with beams of ultrasound which are transmitted in a pattern in which the beams are spatially adjacent to each other over said image field comprising:

means for sequentially transmitting first and second ultrasonic beams at the respective lateral sides of said image field; and means for sequentially transmitting subsequent beams alternately on either lateral side of said image field, wherein successive beam paths are located at decreasing lateral locations with respect to the locations of said first and second ultrasonic beam locations.

10. The ultrasonic apparatus of claim 9, further comprising means for varying the intervals of time between transmission of time sequential beams from relatively lesser intervals between beams transmitted in the vicinity of the lateral extremes of said image field to relatively greater intervals between the times of successive transmission of more centrally located beams.

11. Ultrasonic apparatus for scanning an image field of a subject extending in substantially opposite directions from the center of said field to lateral extremes of said field with beams of ultrasound which are transmitted in a pattern in which the beams are spatially adjacent to each other over said image field comprising:

means for sequentially transmitting first and second ultrasonic beams on one side of the center of said image field;

means for sequentially transmitting ultrasonic beams on said one side of said center of said image field in a pattern which diverges from said first and second beams; and means for sequentially transmitting ultrasonic beams in a pattern which converges toward a location in said image field on the opposite side of the center of said image field from said first and second ultrasonic beams.

12. The ultrasonic apparatus of claim 11, wherein said means for sequentially transmitting ultrasonic beams in a pattern which diverges transmits one beam in a direction which is at a greater lateral distance from the center of said image field than either said first or second beam, and transmits another beam in a direction which is closer to the center of said image field than either said first or second beam.

13. The ultrasonic apparatus of claim 11, further comprising means for successively scanning said image field starting from a different location of said first ultrasonic beam from one scan of said image field to the next.

14. A method for scanning an image field with pulses of ultrasonic energy which are transmitted in a plurality of beam directions extending spatially adjacent to each other over said image field from one lateral extreme of said image field and through the center of said image field to an opposite lateral extreme, comprising the steps of:

a) transmitting first and second ultrasonic beams adjacent to each other on one side of the center of said image field and then b) transmitting successive ultrasonic beams in directions which laterally diverge from the location of said first and second beams; and then c) transmitting successive beams in directions which converge on a location in said image field.

15. The method of claim 14, which step c) comprises the step of transmitting successive beams in directions which converge on a location on the opposite side of the center of said image field from the side of said first and second beams.

16. The method of claim 15, further comprising the steps of:

d) assembling an ultrasonic image frame from echoes received following the beam transmissions of a three step scanning sequence; and e) following the assembly of at least two ultrasonic image frames, producing an image frame which is an average of two or more image frames.

17. The method of claim 14, further comprising the steps of d) scanning said image field again by transmitting third and fourth ultrasonic beams adjacent to each other at locations different from those of said first and second ultrasonic beams; and then e) transmitting successive ultrasonic beams in directions which laterally diverge from the location of said third and fourth beams; and then f) repeating step c).

18. Ultrasonic apparatus for scanning an image field of a subject extending in substantially opposite directions from the center of said field to lateral extremes of said field with beams of ultrasound which are transmitted in a pattern in which the beams are spatially adjacent to each other over said image field comprising:

convergent means for sequentially transmitting ultrasonic beams alternately on lateral sides of said image field wherein successive beam paths are located at decreasing lateral locations with respect to said center of said field;

means for assembling a first ultrasonic image from echoes received in response to said beam transmissions of said convergent means;

divergent means for sequentially transmitting ultrasonic beams alternately on lateral sides of said center of said image field wherein successive beam paths are located at increasing lateral locations with respect to said center of said field;

means for assembling a second ultrasonic image from echoes received in response to said beam transmissions of said divergent means; and means for averaging two or more ultrasonic images.

* * * * *